United States Patent [19]

Tyler, Jr. et al.

[11] 4,366,295

[45] Dec. 28, 1982

[54] STABLE PRECATALYZED EPOXY RESIN COMPOSITIONS

[75] Inventors: Manuel C. Tyler, Jr., Angleton; Avis L. McCrary, Lake Jackson, both of Tex.

[73] Assignee: The Dow Chemical Company, Midland, Mich.

[21] Appl. No.: 269,223

[22] Filed: Jun. 1, 1981

[51] Int. Cl.$^3$ .............................................. C08G 59/68
[52] U.S. Cl. ................................... 525/482; 528/104; 528/89; 528/98; 528/99; 525/507; 528/102; 252/182
[58] Field of Search ................... 528/89, 104, 98, 99, 528/102; 525/482, 507; 252/182

[56] References Cited

U.S. PATENT DOCUMENTS

| | | | |
|---|---|---|---|
| 3,477,990 | 11/1969 | Dante et al. | 260/47 |
| 3,931,109 | 1/1976 | Martin | 528/89 X |
| 3,948,855 | 4/1976 | Perry | 260/47 EP |
| 4,048,141 | 9/1977 | Doorakian et al. | 528/89 |
| 4,302,574 | 11/1981 | Doorakian et al. | 528/89 |

FOREIGN PATENT DOCUMENTS 893191  2/1972  Canada ............................. 402/267

*Primary Examiner*—Earl A. Nielsen
*Attorney, Agent, or Firm*—James G. Carter

[57] ABSTRACT

Compositions containing a relatively low equivalent weight epoxy resin and an advancement catalyst for reacting said epoxy resin with a polyhydric phenol are stable at high storage temperatures when the advancement catalyst is a phosphonium salt of phosphoric acid, phosphorous acid or polyphosphoric acid.

9 Claims, No Drawings

STABLE PRECATALYZED EPOXY RESIN COMPOSITIONS

BACKGROUND OF THE INVENTION

Precatalyzed epoxy resin compositions containing a relatively low equivalent weight epoxy resin and a phosphonium compound have been employed to prepare relatively high molecular weight resins by reacting with a polyhydric phenol. Such compositions are subject to storage over prolonged periods of time and in many instances, the composition loses its catalytic activity after such storage at elevated temperatures, which results in an epoxy resin having a significantly different epoxide content than expected from a ratio of epoxy to phenolic hydroxy groups as well as detrimental increases in viscosity.

These problems have been overcome by the present invention which pertains to a precatalyzed epoxy resin which is relatively stable at elevated temperatures.

SUMMARY OF THE INVENTION

The present invention pertains to an improvement in a precatalyzed epoxy resin composition containing a mixture of (A) a relatively low equivalent weight epoxy resin having an average of more than one glycidyl ether group per molecule and (B) a phosphonium compound as a catalyst for the reaction between said liquid epoxy resin and a phenolic-hydroxyl containing compound which is subsequently blended with said precatalyzed epoxy resin composition; wherein the improvement is that which provides a stable precatalyzed epoxy resin composition as evidenced by (1) after subjecting said precatalyzed epoxy resin composition to a temperature of about 200° F. (93.3° C.) for about 48 hours;
  (a) not more than 50% of the phosphonium groups originally present in said mixture are deactivated;
  (b) the viscosity has not increased by more than 30% of the original value; and
(2) after subjecting said precatalyzed resin composition to a temperature of 200° F. (93.3° C.) for about 63 hours, the product resulting from its reaction with a phenolic hydroxyl-containing compound having an average of more than one phenolic hydroxyl group per molecule, has a % epoxide value not greater than the value obtained by dividing the theoretical % epoxide value by 0.9;

by employing as the catalyst, a phosphonium salt of phosphoric acid, phosphorous acid, polyphosphoric acid or mixture thereof, which salts are represented by the formula

wherein each R is independently a hydrocarbyl group having from 1 to about 20, preferably from about 2 to about 8, carbon atoms or the group $R^1Y$ wherein $R^1$ is a aliphatic hydrocarbon group having from 1 to about 20, preferably from about 2 to about 8, carbon atoms and Y is Cl, Br, I, $NO_2$ or OH and Z is a phosphate

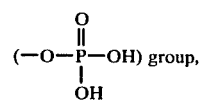

a phosphite

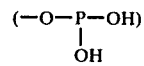

or a polyphosphate group or mixture thereof.

DETAILED DESCRIPTION OF THE INVENTION

Suitable relatively low equivalent weight epoxy resins which can be employed in the compositions of the present invention include those represented by the formulas:

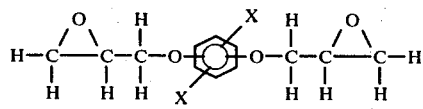

(I)

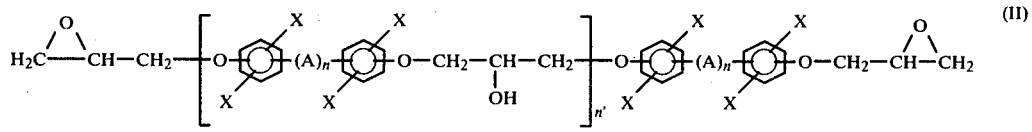

(II)

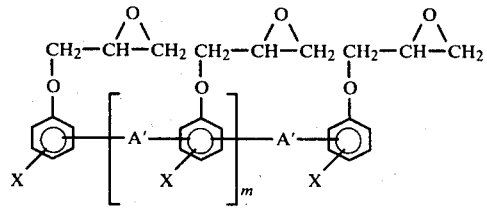

wherein A is independently a divalent hydrocarbon group having from one to about 8 carbon atoms, —O—, —S—,

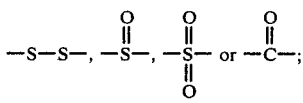

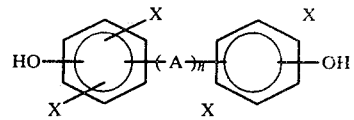

wherein each A, X and n are as defined above.

Particularly suitable aromatic hydroxyl-containing compounds are the bisphenols such as bisphenol A.

each A' is independently a divalent hydrocarbon group having from one to about 8 carbon atoms; each X is independently hydrogen, bromine, chlorine or a hydrocarbon group having from one to about 8 carbon atoms; n has a value of zero or 1; n' has an average value less than about 0.9, preferably less than about 0.2, most preferably from about 0.01 to about 0.15 and m has an average value of from about 0.1 to about 4, preferably from about 0.8 to about 2.

Suitable phosphonium compounds which can be employed in the compositions of the present invention include, for example, those represented by the formula

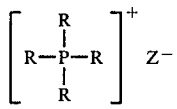

wherein each R is independently a hydrocarbyl group having from 1 to about 20, preferably from about 2 to about 8, carbon atoms or the group $R^1Y$ wherein $R^1$ is an aliphatic hydrocarbon group having from 1 to about 20 carbon atoms and Y is Cl, Br, I, $NO_2$ or OH and Z is a phosphate

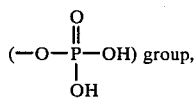

a phosphite

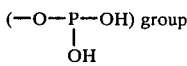

or a polyphosphate group. Mixtures of such catalysts can also be employed.

Particularly suitable phosphonium catalysts which can be employed include, for example, ethyltriphenyl phosphonium phosphate, ethyltriphenyl phosphonium phosphite, tetrabutyl phosphonium phosphate, tetrabutyl phosphonium phosphite, mixtures thereof and the like.

Suitable aromatic hydroxyl containing compounds which can be reacted with the compositions of the present invention to prepare epoxy resins which are relatively high in molecular weight include, for example, those represented by the formulas:

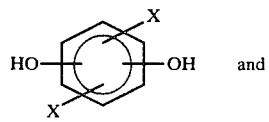

and

CATALYST A was the reaction product of a 70% solution of ethyltriphenyl phosphonium acetate.acetic acid complex in methanol and phosphoric acid in a molar ratio of one to one. The resultant product was diluted to 30% by weight with methanol.

CATALYST B was the reaction product of a 70% solution of ethyltriphenyl phosphonium acetate.acetic acid complex in methanol and phosphoric acid in a molar ratio of one to one. The by-product acetic acid was removed by recrystallization from methanol. The recrystallized ethyltriphenyl phosphonium phosphate was then diluted with methanol to provide a 30% by weight solution.

CATALYST C was the reaction product of a 70% solution of ethyltriphenyl phosphonium acetate.acetic acid complex and 118% phosphoric acid (polyphosphoric acid) in a molar ratio of one to one. The resultant product was diluted to 30% by weight with methanol.

CATALYST D was the reaction product of a 70% solution of ethyltriphenyl phosphonium acetate.acetic acid complex in methanol and phosphorous acid in a molar ratio of one to one. The resultant product was diluted to 30% by weight with methanol.

CATALYST E was the reaction product of a 70% solution of tetrabutyl phosphonium acetate.acetic acid complex in methanol and phosphoric acid in a molar ratio of one to one. The resultant product was diluted to 30% by weight with methanol.

CATALYST F was a 20% solution of ethyltriphenyl phosphonium iodide in the methyl ether of ethylene glycol.

CATALYST G was a 30% solution of ethyltriphenyl phosphonium acetate.acetic acid complex in methanol.

CATALYST H was the reaction product of Catalyst F with phosphoric acid in a molar ratio of one to one. The resultant product was diluted to 30% by weight with methanol.

CATALYST I was the reaction product of ethyl triphenyl phosphonium bicarbonate with diethyl phosphate in a molar ratio of one to one. The resultant product was diluted to 30% by weight with methanol.

CATALYST J was a 70% solution of tetrabutyl phosphonium acetate.acetic acid complex in methanol.

EPOXY RESIN A was a diglycidyl ether of bisphenol A having an average epoxide equivalent weight of about 188.

EPOXY RESIN B was a diglycidyl ether of bisphenol A having an average epoxide equivalent weight of about 189.

EPOXY RESIN C was a mixture of 85% by weight of Epoxy Resin A and 15% by weight of an epoxy novolac resin having an average epoxide equivalent weight of about 181 and an average functionality of about 3, the resultant mixture having an average epoxide equivalent weight of about 192.

EPOXY RESIN D was a mixture of 98.5% by weight of Epoxy Resin A and 1.5% by weight of the hydrolysis product of the diglycidyl ether of bisphenol A A and an EEW of about 188 prior to hydrolysis; the resultant mixture having an EEW of about 192.

HEAT AGING

The storage stability of precatalyzed epoxy resin compositions was provided by placing the following compositions in a 200° F. (93.3° C.) oven for various periods of time.

300 g epoxy resin
12.5 g xylene
0.313 g catalyst (solvent free basis)

The epoxy resin, catalysts employed and results, active catalyst remaining, are given in Table I.

ACTIVE CATALYST DETERMINATION (1) 0.5 g of precatalyzed resin is dissolved in methylene chloride and brought to a 25 ml volume; (2) a 5 ml aliquot is taken, to which 15 ml of methylene chloride and 1 ml of 0.1% aqueous solution of methyl orange indicator are added all in a 2 oz. bottle; (3) this mixture is shaken for one minute, then allowed to stand for 5 minutes; (4) a 10 ml aliquot is then taken and filtered into a Klett tube, which is placed in the Klett colorimeter. The colorimeter measures the color intensity which is directly proportional to active catalyst (phosphonium cation) levels. Catalyst concentration is then taken based on the PPM active catalyst per Klett unit.

ADVANCEMENT AFTER AGING (1) After the aging period, a new EEW is calculated; (2) bisphenol A is added to theoretically provide a final product having a 3000 EEW (1.43% epoxy); (3) the n-butyl ether of ethylene glycol is added to bring the system to 85% solids, with this dilution, system should reach 1.27% epoxy if no solvent is lost. The epoxy resin, bisphenol A and n-butyl ether of ethylene glycol are added at room temperature and heated at 2°–3° C./min. to 175° C., where the heating means is cut off and the system allowed to exotherm. The resin is cooked for four hours after exotherm to acquire the finished product.

TABLE I

| EXAMP. OR COMP. EXPT. NO. | CATALYST | EPOXY RESIN | HOURS AT 200° F. | ACTIVE CATALYST PPM | % PHOSPHONIUM GROUPS REMAINING | VISCOSITY AT 25° C. CENTISTOKES | % OF ORIGINAL | RESIN ADVANCEMENT[3] HOURS PAST EXOTHERM | PERCENT EPOXIDE | VALUE OF THEORETICAL % EPOXIDE DIVIDED By 0.9 |
|---|---|---|---|---|---|---|---|---|---|---|
| 1 | A | A | 0 | 1000 | 100 | 2600 | N.A.[6] | | | 1.41 |
| | | | 24 | 755 | 75.5 | N.D. | | 1 | 1.60 | |
| | | | 48 | 650 | 65 | 3023 | 116 | 3 | N.D.[4] | |
| | | | 63 | 545 | 54.5 | N.D. | | 4 | 1.37 | |
| 2 | B | A | 0 | 1000 | 100 | 2600 | N.A. | | | 1.41 |
| | | | 24 | 840 | 84 | N.D. | | 1 | 1.48 | |
| | | | 48 | 680 | 68 | 2966 | 114 | 3 | 1.20 | |
| | | | 63 | 670 | 67 | | | 4 | 1.14 | |
| 3[1] | A | A | 0 | 1000 | 100 | 8115 | N.A. | | | 1.41 |
| | | | 24 | 655 | 65.5 | N.D. | | 1 | 1.42 | |
| | | | 48 | 575 | 57.5 | 10286 | 127 | 3 | 1.21 | |
| | | | 63 | 510 | 51 | N.D. | | 4 | 1.16 | |
| 4 | A | B | 0 | 1000 | 100 | 2114 | N.A. | | | 1.41 |
| | | | 24 | 710 | 71 | N.D. | | 1 | 1.41 | |
| | | | 48 | 645 | 64.5 | 2659 | 126 | 3 | 1.14 | |
| | | | 63 | 600 | 60 | | | 4 | 1.00 | |
| 5 | C | A | 0 | 1000 | 100 | 2600 | N.A. | | | 1.41 |
| | | | 24 | 655 | 65.5 | N.D. | | 1 | 1.47 | |
| | | | 48 | 555 | 55.5 | 2889 | 111 | 3 | 1.16 | |
| | | | 63 | 505 | 50.5 | N.D. | | 4 | 1.11 | |
| 6 | D | A | 0 | 1000 | 100 | 2600 | N.A. | | | 1.41 |
| | | | 24 | 1000 | 100 | N.D. | | 1 | 1.22 | |
| | | | 48 | 1000 | 100 | 3373 | 130 | 3 | 0.95 | |
| | | | 63 | 975 | 97.5 | N.D. | | 4 | 0.92 | |
| 7 | E | A | 0 | 1000 | 100 | 2600 | N.A. | | | 1.41 |
| | | | 24 | 1000 | 100 | N.D. | | 1 | 1.25 | |
| | | | 48 | 1000 | 100 | 2966 | 114 | 3 | 0.98 | |
| | | | 63 | 985 | 98.5 | N.D. | | 4 | 0.92 | |
| A[2] | F | A | 0 | 1000 | 100 | 2600 | N.A. | | | 1.41 |
| | | | 24 | 425 | 42.5 | N.D. | | 1 | 3.65 | |
| | | | 48 | 210 | 21.0 | 2996 | 115 | 3 | N.D. | |
| | | | 63 | 185 | 18.5 | N.D. | | 4 | 1.89 | |
| B[2] | G | A | 0 | 1000 | 100 | N.D. | N.D. | | | |
| | | | 4 | 115 | 11.5 | N.D. | N.D. | N.D. | N.D. | |
| 8[5] | A | A | 0 | 1000 | 100 | 2939 | N.A. | | | 1.59 |
| | | | 24 | 523 | 52.3 | N.D. | | 1 | 1.53 | |
| | | | 48 | 538 | 53.8 | 3268 | 111 | 3 | 1.40 | |
| | | | 63 | 561 | 56.1 | N.D. | | 4 | 1.37 | |
| 9 | A | C | 0 | 1000 | 100 | 3367 | N.A. | | | 1.41 |
| | | | 24 | 836 | 83.6 | N.D. | | 1 | 1.46 | |
| | | | 48 | 627 | 62.7 | 3673 | 109 | 3 | 1.16 | |
| | | | 63 | 564 | 56.4 | | | 4 | 1.12 | |
| 10 | H | A | 0 | 1000 | 100 | 2600 | N.A. | | | 1.41 |
| | | | 24 | 871 | 87.1 | N.D. | | 1 | 1.45 | |
| | | | 48 | 803 | 80.3 | 2941 | 113 | 3 | 1.16 | |
| | | | 63 | 750 | 75.0 | N.D. | | 4 | 1.12 | |
| C[2] | I | A | 0 | 1000 | 100 | 2600 | N.A. | | | 1.41 |
| | | | 24 | 351 | 35.1 | N.D. | | 1 | 1.93 | |
| | | | 48 | 390 | 39.0 | 3371 | 130 | 3 | 1.67 | |
| | | | 63 | 357 | 35.7 | N.D. | | 4 | 1.60 | |
| D[2] | I | D | 0 | 1000 | 100 | 2940 | N.A. | | | 1.41 |
| | | | 24 | 350 | 35.0 | N.D. | | 1 | 1.79 | |

TABLE I-continued

| EXAMP. OR COMP. EXPT. NO. | CATALYST | EPOXY RESIN | HOURS AT 200° F. | ACTIVE CATALYST PPM | % PHOSPHONIUM GROUPS REMAINING | VISCOSITY AT 25° C. CENTISTOKES | % OF ORIGINAL | RESIN ADVANCEMENT[3] HOURS PAST EXOTHERM | PERCENT EPOXIDE | VALUE OF THEORETICAL % EPOXIDE DIVIDED By 0.9 |
|---|---|---|---|---|---|---|---|---|---|---|
|  |  |  | 48 | 343 | 34.3 | 3435 | 117 | 3 | 1.39 |  |
|  |  |  | 63 | 364 | 36.4 | N.D. |  | 4 | 1.33 |  |
| E[2] | J | A | 0 | 1000 | 100 | 2600 | N.A. |  |  | 1.41 |
|  |  |  | 24 | 1000 | 100 |  |  | 1 | 1.33 |  |
|  |  |  | 48 | 1000 | 100 | 8296 | 219 | 3 | gelled after |  |
|  |  |  | 63 | 1000 | 100 |  |  | 4 | 1.5 hrs. |  |

FOOTNOTES TO TABLE
[1]Xylene was omitted from the heat aging composition.
[2]Comparative Experiment
[3]The resin-catalyst mixture was advanced with bisphenol A after aging at 200° F. for 63 hours. The % epoxide was measured after 1, 3 and 4 hours after exotherm was recorded and the % epoxide is based on total composition including solvent. The theoretical % epoxide was 1.27 %.
[4]N.D. = Not Determined.
[5]The epoxidation was conducted without solvent therefore the theoretical % epoxide was 1.43% instead of 1.27%.
[6]N.A. = Not Applicable.

We claim:

1. In a precatalyzed epoxy resin composition containing a mixture of (A) a relatively low equivalent weight epoxy resin having an average of more than one glycidyl ether group per molecule and (B) a phosphonium compound as a catalyst for the reaction between said epoxy resin and a phenolic-hydroxyl containing compound which is subsequently blended with said precatalyzed epoxy resin composition; the improvement which provides a stable precatalyzed epoxy resin composition as evidenced by, (1) after subjecting said precatalyzed epoxy resin composition to a temperature of about 200° F. (93.3° C.) for about 48 hours;
      (a) not more than 50% of the phosphonium groups originally present in said mixture are deactivated;
      (b) the viscosity has not increased by more than 30% of the original value; and
   (2) after subjecting said precatalyzed resin composition to a temperature of 200° F. (93.3° C.) for about 63 hours, the product resulting from its reaction with a phenolic hydroxyl-containing compound having an average of more than one phenolic hydroxyl group per molecule has a % epoxide value not greater than the value obtained by dividing the theoretical % epoxide value by 0.9;

by employing as the catalyst, a phosphonium salt of phosphoric acid, phosphorous acid, polyphosphoric acid or mixture thereof, which salts are represented by the formula

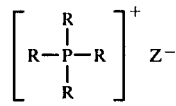

wherein each R is independently a hydrocarbyl group having from 1 to about 20 carbon atoms or the group R$^1$Y wherein R$^1$ is a aliphatic hydrocarbon group having from 1 to about 20 carbon atoms and Y is Cl, Br, I, NO$_2$ or OH and Z is a phosphate group having the formula

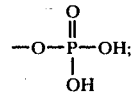

a phosphite group having the formula

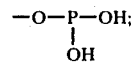

a polyphosphate group or mixture thereof.

2. The composition of claim 1 wherein the epoxy resin is a diglycidyl ether of bisphenol A having an average epoxide equivalent weight of from about 175 to about 195 and the catalyst is ethyltriphenyl phosphonium phosphate, ethyltriphenyl phosphonium phosphite, ethyltriphenyl phosphonium polyphosphate, tetrabutylphosphonium phosphate or mixture thereof.

3. The composition of claim 1 wherein the epoxy resin is a mixture of a diglycidyl ether of bisphenol A and a phenol formaldehyde epoxy novolac resin and the catalyst is ethyltriphenyl phosphonium phosphate, ethyltriphenyl phosphonium phosphite, ethyltriphenyl phosphonium polyphosphate, tetrabutylphosphonium phosphate or mixture thereof.

4. The composition of claims 2 or 3 wherein said catalyst is prepared by reacting a phosphonium compound wherein the anion portion thereof is a bicarbonate, a halide or a carboxylate.carboxylic acid complex.

5. The composition of claim 4 wherein said anion is an iodide or an acetate.acetic acid complex.

6. The composition of claim 5 wherein the cation portion of said phosphonium compound is ethyl triphenyl or tetrabutyl.

7. The composition of claims 2 or 3 which has been prepared by adding phosphoric acid, phosphorous acid or polyphosphoric acid to a mixture of (A) said epoxy resin and (B) a phosphonium compound wherein the anion portion thereof is a bicarbonate, a halide or a carboxylate.carboxylic acid complex.

8. The composition of claim 7 wherein said anion is an iodide or an acetate.acetic acid complex.

9. The composition of claim 8 wherein the cation portion of said phosphonium compound is ethyl triphenyl or tetrabutyl.

* * * * *

UNITED STATES PATENT AND TRADEMARK OFFICE
CERTIFICATE OF CORRECTION

PATENT NO. : 4,366,295

DATED : December 28, 1982

INVENTOR(S) : Manuel C. Tyler, Jr., and Avis L. McCrary

It is certified that error appears in the above—identified patent and that said Letters Patent is hereby corrected as shown below:

Col. 2, third formula, after the right-hand bracket; remove "-" and insert therefor --m--. Also add Roman numeral three in parenthesis --(III)-- opposite and to the right of this formula.

Col. 4, second occurrence of benzene rings, add the bonds joining X to the benzene ring but not specifying the particular position with respect to any specific carbon atom as in the first benzene ring.

Signed and Sealed this

Second Day of August 1983

[SEAL]

Attest:

GERALD J. MOSSINGHOFF

Attesting Officer

Commissioner of Patents and Trademarks